Jan. 19, 1932.   R. P. LIER ET AL   1,841,657
COMBINED AUTOMOBILE TRUNK AND LUGGAGE CARRIER
Filed Oct. 24, 1928   2 Sheets-Sheet 1

Inventor
R. Paul Lier
Harry R. Lower
By Clarence A. O'Brien
Attorney

Jan. 19, 1932. R. P. LIER ET AL 1,841,657
COMBINED AUTOMOBILE TRUNK AND LUGGAGE CARRIER
Filed Oct. 24, 1928  2 Sheets-Sheet 2
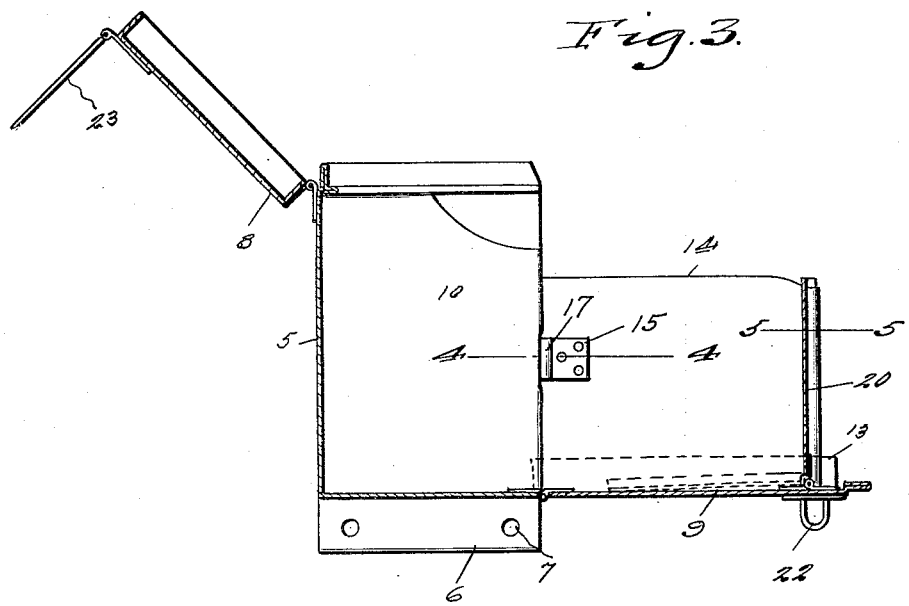
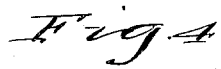
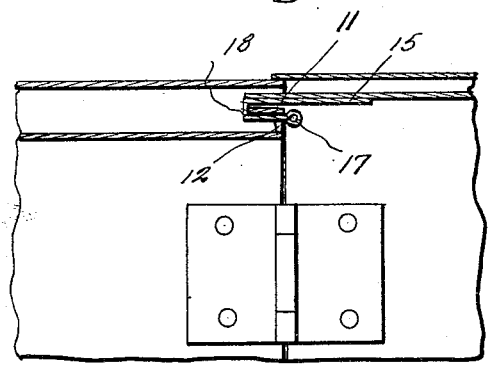
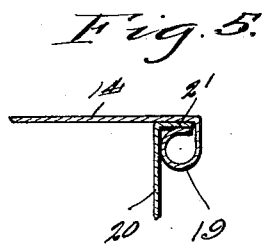
Inventor
R. Paul Lier
Harry R. Lower
By Clarence A. O'Brien
Attorney Patented Jan. 19, 1932

1,841,657

UNITED STATES PATENT OFFICE

ROBERT PAUL LIER AND HARRY R. LOWER, OF MITCHELL, SOUTH DAKOTA, ASSIGNORS, BY DIRECT AND MESNE ASSIGNMENTS, OF ONE-THIRD TO CHARLES H. JULIUS, OF MINNEAPOLIS, MINNESOTA

COMBINED AUTOMOBILE TRUNK AND LUGGAGE CARRIER

Application filed October 24, 1928. Serial No. 314,800.

This invention relates to new and useful improvements in trunks, and luggage carriers for arrangement upon the usual rack at the rear end of an automobile and aims to provide a single device that may be employed as either a closed trunk or an open luggage carrier. Furthermore the structure is such as to permit of the rapid change of the device from a trunk to a luggage carrier and vice versa and this without requiring any skill or effort on the part of the driver of the machine.

Furthermore, the invention aims to provide a combined device of this character that is generally simple in construction and compact in its arrangement the various structural features being so combined as to reduce to a minimum any liability of the parts rattling during the movement of the car.

With the foregoing and other objects in view as the nature of the invention will be better understood, the same comprises the novel form, combination and arrangement of parts hereinafter more fully described, shown in the accompanying drawings and claimed.

In the drawings, wherein like reference characters indicate corresponding parts throughout the several views.

Figure 3 is a detail transverse section through the device in open condition, and Figures 4 and 5 are enlarged horizontal fragmentary sections taken substantially on the lines 4—4 and 5—5 of Figure 3 for bringing out certain detail structural features of the device.

Figure 2:
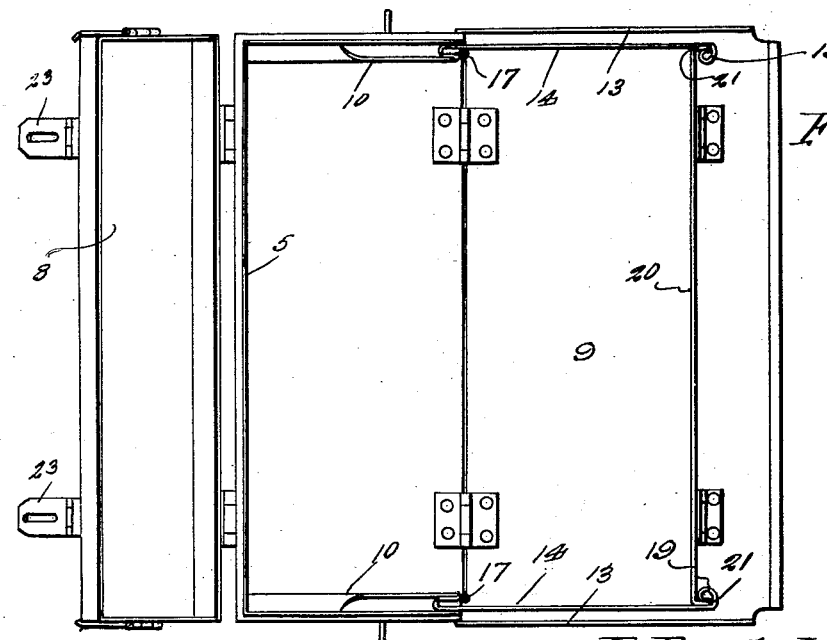
Figure 2 is a top plan view of the device when completely open.

Now having particular reference to the drawings, our novel trunk and luggage carrier consists of a main body 5 of suitable material, and size, open at its top and outer side as clearly illustrated in Figures 2 and 3. At opposite ends the bottom wall of this body 5 is formed with depending tongues 6—6 having openings 7 adjacent their opposite ends, these tongues adapted for engagemnt through the usual bars of a conventional automobile rack A after which suitable fastening means A associated with the rack and passing through said tongue openings 7 are employed to secure the device to the rack. Hinged to the rear wall of this body 5 adjacent its upper end is a suitable lid 8 constructed for engagement over the upper open end of the body when in closed position, said upper open end of the body being of slightly reduced diameter so as to accommodate the lid 8 in such a manner as to bring about the flush relation of the side walls of the lid with the corresponding walls of the body. Hinged to the forward edge of the bottom wall of the body 5 at the open side of said body is a wall 9 that cooperates with the bottom wall of the body 5 to provide a bottom wall for the luggage carrier when the device is being used as a luggage carrier or to provide a front wall of the body 5 when the deivce is being employed as a trunk. Located within the said body 5 at the oposite end walls thereof are false walls 10—10 having slight spaced relation with the end walls of said body, at their forward edges these false walls 10—10 are provided with rearwardly extending flanges 11 that have spaced relation with respect to the said false walls and with respect to the end walls of the said body. The material uniting these flanges 11 with the false walls 10—10 is provided centrally in each instance with a slot 12 for a puropse presently to be described. The swinging wall 9 is provided at its opposite longitudinal edges with flanges 13—13 for engagement over the end walls of the body 5 when said wall 9 is swung upwardly to close the front side of said body 5. In spaced relation with these flanges 13—13, said swinging wall 9 is provided with perpendicular walls 14—14, the length of which is less than the height of the false walls 10—10 in said body 5, while the outer ends of these walls 14—14 terminate inwardly of the outer edge of said wall, see Figure 2. Furthermore, these walls 14—14 are adapted for movement between the end walls of the body 5, and the said body false walls 10—10. At adjacent their inner edges these walls 14—14 are provided with tongues 15, the inner ends of which are bent inwardly and then rearwardly to provide in each instance a tongue 18 having a bead 17 upon its outer end, these beads adapted for engagement through the said slots 12 when the wall 9 is swung downwardly into horizontal position for securing said wall in this position, see Figure 4. The forward edges of said perpendicular walls 14—14 are provided with inwardly extending beads 19, while hinged to the swinging wall 9 adjacent these forward edges of the wall 14—14 is a wall 20, which when raised to the perpendicular position disclosed in Figures 2 and 3, after the wall 9 has been swung downwardly will define the forward wall for the luggage carrier. The opposite edges of this wall 20 are provided with outwardly extended flanges 21—21 for wedged engagement between the beads 19 and said perpendicular walls 14—14 maintaining this wall 20 in raised position. Obviously, in order to facilitate the raising of the wall 9 to close the front side of the body 5 it is necessary that the wall 20 be swung downwardly to the dotted line position as illustrated in Figure 3.

Figure 1:
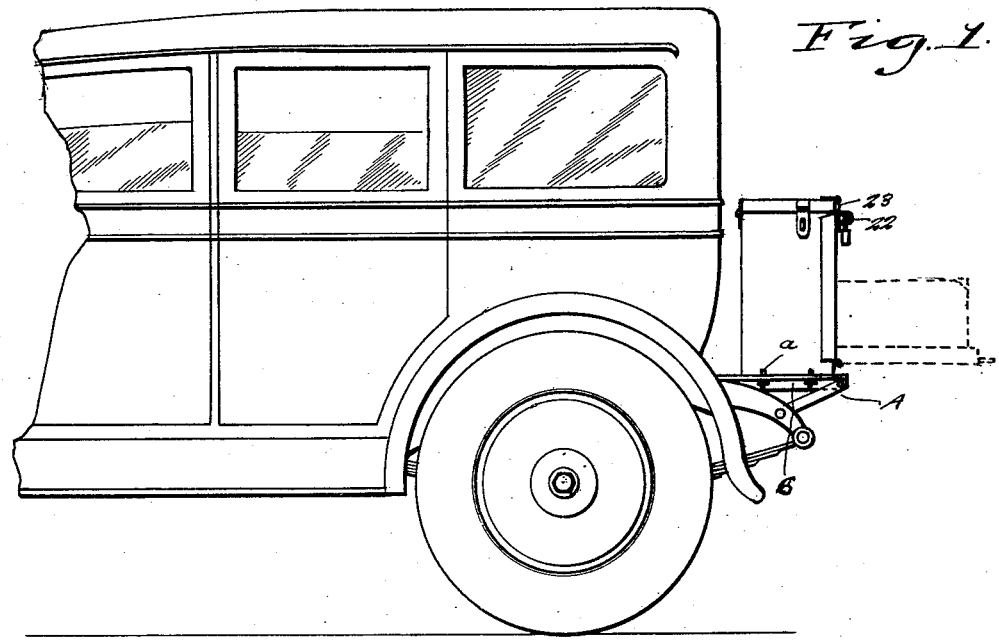
Figure 1 is a fragmentary side elevation of the rear end of a conventional automobile, the usual rack at the rear end thereof being equipped with our improved trunk and luggage carrier.

At the outer surface of the wall 9 and adjacent the free edge thereof are of two or more bails 22 over which hasps 23 carried by the forward edge of the lid 8 are to be engaged, after which suitable locks may be arranged through the bails for locking the lid and wall 9 in closed position, also the opposite ends of said lid 8 are provided with hasps for engagement over bails arranged upon the side walls of the body 5 at the upper ends thereof as disclosed in Figures 1 and 2.

In view of the foregoing description when considered in conjunction with the accompanying drawings it will be apparent that we have provided a novel, simple and useful combined automobile trunk and luggage carrier, even though we have herein shown and described the invention as consisting of certain detail structural elements it is nevertheless to be understood that some changes may be made therein without affecting the spirit and scope of the appended claims.

Having thus described the invention, what we claim as new and desire to secure by Letters Patent is:

1. In a combined automobile trunk and luggage carrier, a trunk body open at its top and front sides, a lid for the open top of said body, inner walls arranged in said body in spaced relation to the end walls of said body, a swinging wall hinged to the forward edge of the bottom wall of the trunk body to provide a closure for the open front side of said body when said wall is swung toward said body, and when swung to a horizontal position to provide a bottom wall for the luggage carrier, a pair of end walls at opposite ends of said swinging wall to provide end walls of the luggage carrier, said last mentioned end walls at their rear edges provided with tongues having inwardly directed extensions terminating in beads, and said inner walls at their forward edges provided with flanges extending laterally therefrom in opposite directions, said flanges provided with slots for receiving therein said beads when said swinging wall is swung to said horizontal position, and an auxiliary wall hinged to said swinging wall adjacent the free edge thereof and adapted to be swung to a vertical position between said last mentioned end walls and adapted to engage with said last mentioned end walls for limiting the swinging movement of said auxiliary wall when the latter is moved to a vertical position.

2. A combined automobile trunk and luggage carrier, a trunk body provided with inner spaced end walls, swinging end walls swingable into the space between said inner and outer end walls, a swinging wall hinged to the bottom of said trunk body for vertical swinging movement, said last mentioned wall adapted to be swung to a horizontal position to provide a continuation of said trunk body, and said swinging end walls adapted to be swung outwardly from between said inner and outer end walls for disposition in spaced parallel relation and at right angles to said last referred to swinging wall, and a wall hinged to said last referred to swinging wall for vertical disposition between said swinging end walls adjacent the forward edges of said swinging end walls, said swinging end walls at the forward edges thereof provided with inwardly directed beads, and flanges formed on the last mentioned swinging wall for wedged engagement with said beads whereby said last mentioned swinging wall is retained in a vertical position against casual displacement.

3. A combined trunk and luggage carrier comprising a trunk body open at the top and one side thereof, said body being further provided with spaced inner and outer end walls, a swinging wall hinged to the bottom of said trunk body, end walls carried by said swinging wall adapted to be swung inwardly between said spaced inner and outer end walls of said body when said swinging hinged wall is swung to a vertical position for closing the said one open side of said trunk body, a second swinging wall hinged to the outer edge of the first swinging hinged wall and adapted to swing to a vertical position between the forward edges of the said end walls carried by the first swinging hinged wall, a cover for the open top of said trunk body, and said first mentioned swinging hinged wall at opposite ends thereof provided with flanges for engagement with the outer end walls of said trunk body when said first mentioned swinging hinged wall is in a vertical closing position.

In testimony whereof, we affix our signatures.

R. PAUL LIER.
HARRY R. LOWER.